J. W. & C. WAYLING.
GRAIN TREATING MACHINE.
APPLICATION FILED APR. 6, 1914.
1,177,666.
Patented Apr. 4, 1916.
2 SHEETS—SHEET 2.
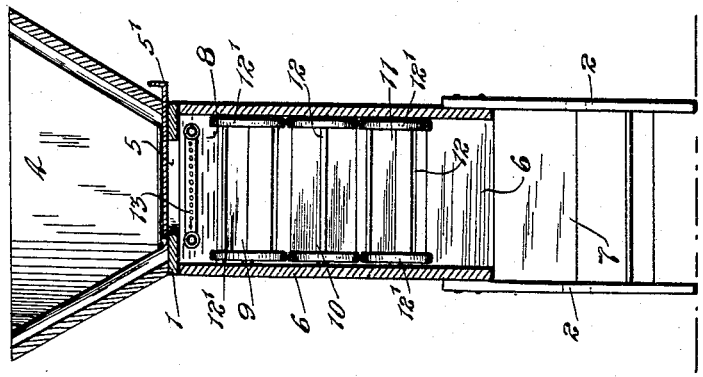
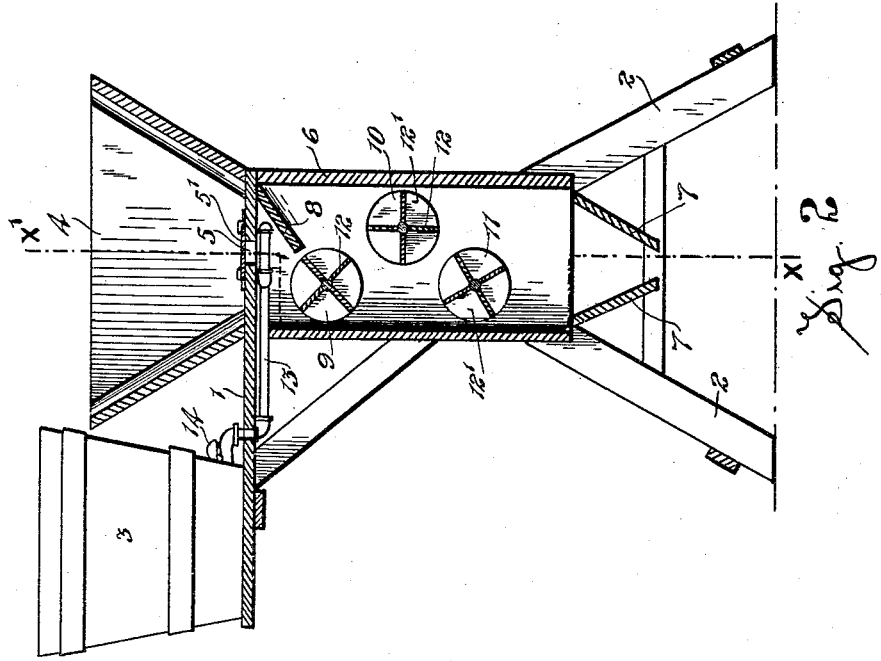
WITNESSES
INVENTORS
J. W. Wayling
C. Wayling
By
Fred B. Fetherstonhaugh
Attorney.

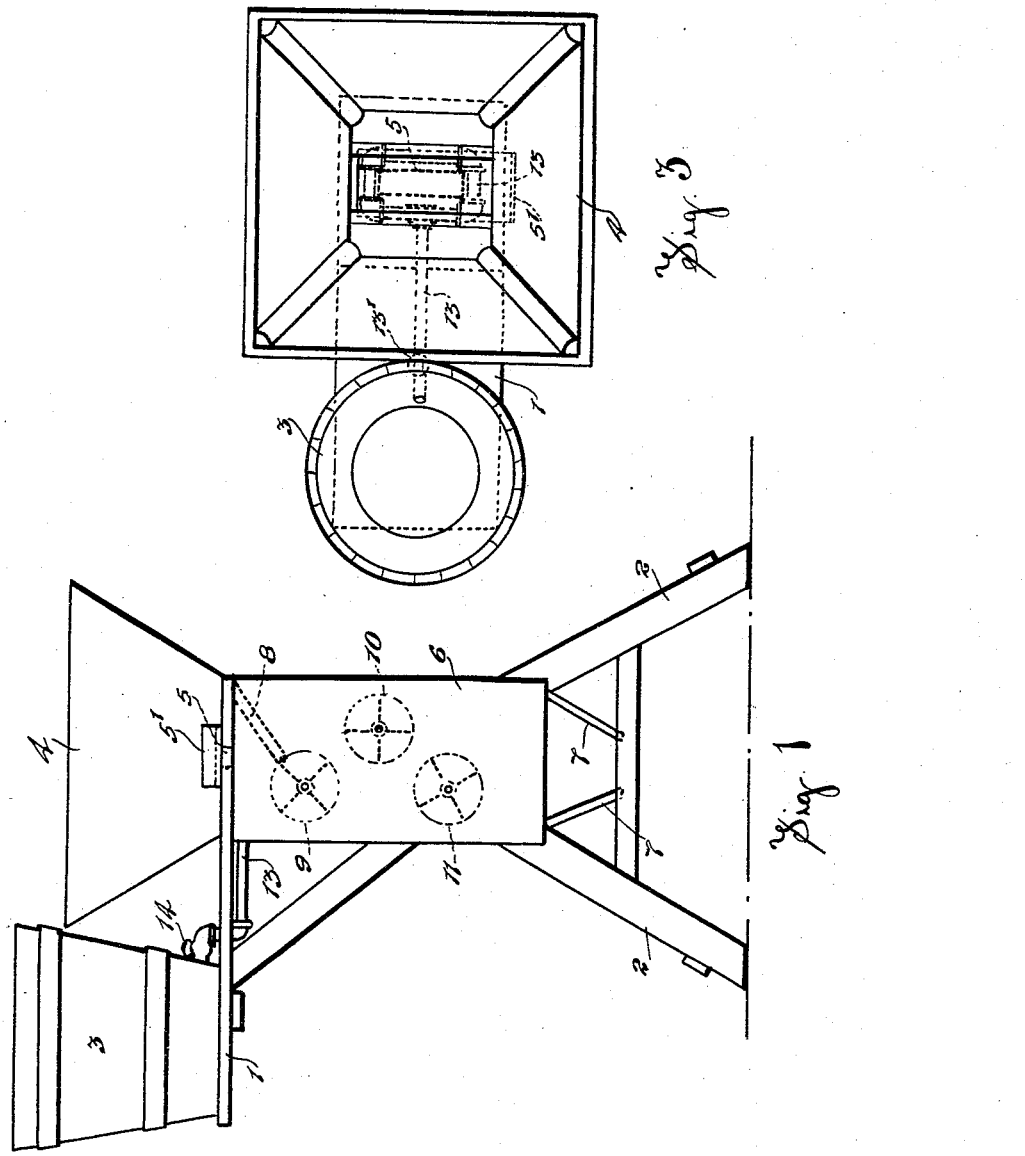

UNITED STATES PATENT OFFICE.

JAMES WILLIAM WAYLING AND CHARLES WAYLING, OF GLEN EWEN, SASKATCHEWAN, CANADA.

GRAIN-TREATING MACHINE.

1,177,666.   Specification of Letters Patent.   Patented Apr. 4, 1916.

Application filed April 6, 1914. Serial No. 830,026.

*To all whom it may concern:*

Be it known that we, JAMES WILLIAM WAYLING and CHARLES WAYLING, both of the town of Glen Ewen, in the Province of Saskatchewan, Canada, have invented certain new and useful Improvements in Grain-Treating Machines, of which the following is the specification.

The invention relates to improvements in grain treating machines and the object of the invention is to provide an inexpensive, easily operated machine wherein one can quickly treat grain for smut and other impurities.

It consists essentially in a suitable supported table carrying a solution tank and a hopper, an open ended box like casing beneath the hopper and provided at the lower end with a chute and at the upper end with a deflecting plate, agitators slidably mounted within the casing and a spray pipe located at the head of the casing and connected with a tank, the parts being arranged and constructed as hereinafter more particularly described.

Figure 1 represents a side view of the complete machine. Fig. 2 represents a vertical sectional view longitudinally through the same. Fig. 3 is a plan view. Fig. 4 is a vertical sectional view through the hopper and casing, the section being taken in the plane denoted by the line X—X, Fig. 2.

In the drawings like characters of reference indicate corresponding parts in each figure.

1 represents a table mounted on suitable legs 2. The table carries a tank 3 and a hopper 4, the hopper opening through a suitable feed opening 5 formed in the table to the interior of an open ended box like casing 6. The casing is suitably fastened to the under side of the table. The feed through the opening 5 is controlled by a sliding gate 5′ which can be arranged in any desirable way such that it can be manipulated from the outside of the hopper. The lower end of the casing is provided with a pair of opposing downwardly converging guide plates 7 forming a chute.

8 is a deflecting plate within the upper end of the casing and adjoining the feed opening, the plate actually inclining downwardly from one of the upper corners to a point about midway across the casing.

9, 10 and 11 are a number of agitators mounted within the casing and provided in the present instance with four vanes arranged more or less at right angles one to the other and having their ends connected to end disks 12′. The agitators are staggered within the casing so that the material passed onto the top one will be directed to the second one which in turn will throw it over onto the bottom one. The top agitator is located immediately adjoining the deflecting plate 8.

13 represents a feed pipe passing from the tank to the upper end of the casing. The feed pipe has the lower end thereof bent to pass around the feed opening 5 and the said bent end is perforated so as to effect a spray within the upper end of the casing.

A valve 14 is inserted in the feed pipe to control the flow of the treating solution through the pipe from the tank.

When the device is used the grain to be treated is placed in the tank. The gate is opened to allow the grain to flow from the hopper and at the same time the valve is opened. As the grain falls through the feed pipe it is deflected by the deflecting plate onto the top agitator which turns and drops it onto the second agitator, this in turn depositing it onto the bottom agitator.

In passing through the bent perforated end of the pipe the grain is effectively treated with the solution spraying from the pipe. The grain finally escaping through the chute at the bottom of the casing will be found to be effectively treated with the solution as the agitators thoroughly mix and turn over the grain as it is passed through the casing.

What we claim as our invention is:—

In a grain treating machine the combination with a suitably mounted table, a feed hopper having the bottom thereof opening through the table, an open ended, vertically disposed, box-like casing disposed beneath the underside of the table and having the upper end thereof surrounding the feed opening and a solution feed pipe contained within the upper end of the casing and surrounding the feed opening and having the inner side thereof perforated, of a plurality of similar rotatable agitators disposed within the casing and mounted on horizontal axes and staggered in relation to each other throughout the length of the casing, each agitator being formed from end disks and intervening vanes radiating from the supporting axis and an inclined deflecting plate within the upper end of the casing and adjacent the feed opening and designed to deflect material onto the inner side of the upper of the agitators.

Signed at Carnduff this 9th day of March, 1914.

JAMES WILLIAM WAYLING.
CHARLES WAYLING.

In the presence of—
PETER CARNDUFF,
W. R. FOULDS.

Copies of this patent may be obtained for five cents each, by addressing the "Commissioner of Patents, Washington, D. C."